(12) United States Patent
Kim et al.

(10) Patent No.: US 7,955,592 B2
(45) Date of Patent: Jun. 7, 2011

(54) SELECTIVE SEPARATION OF HEAVY METAL ION USING METAL ION IMPRINTED POLYMER (MIIP)

(75) Inventors: Dukjoon Kim, Seoul (KR); Dam Hoang Anh, Gyeonggi-do (KR)

(73) Assignee: Sungkyunkwan University Foundation for Corporate Collaboration, Suwon, Gyeonggi-Do (KR)

( * ) Notice: Subject to any disclaimer, the term of this patent is extended or adjusted under 35 U.S.C. 154(b) by 1117 days.

(21) Appl. No.: 11/706,901

(22) Filed: Feb. 13, 2007

(65) Prior Publication Data

US 2007/0191551 A1 Aug. 16, 2007

(30) Foreign Application Priority Data

Feb. 16, 2006 (KR) ........................ 10-2006-0015107

(51) Int. Cl.
*A61K 8/721* (2006.01)
(52) U.S. Cl. .................. 424/70.11; 424/70.16; 424/70.4
(58) Field of Classification Search .................. None
See application file for complete search history.

(56) References Cited

U.S. PATENT DOCUMENTS

| | | |
|---|---|---|
| 5,872,198 A | 2/1999 | Mosbach et al. |
| 5,959,050 A | 9/1999 | Mosbach et al. |
| 6,248,842 B1 | 6/2001 | Singh et al. |

FOREIGN PATENT DOCUMENTS

| | | |
|---|---|---|
| CN | 1390861 A | 1/2003 |
| WO | WO 86/00953 | 2/1986 |
| WO | 2005/063382 A1 | 7/2005 |
| WO | 2007/055767 A1 | 5/2007 |

OTHER PUBLICATIONS

Say et al. Analytica Chimica Acta 480 (2003) 251-258.*
Office Action Issued in Chinese Application No. 200710079224.6, Feb. 20, 2009.
Office Action Issued in Japanese Application No. 2007-005702.

* cited by examiner

*Primary Examiner* — Michael G Hartley
*Assistant Examiner* — James W Rogers
(74) *Attorney, Agent, or Firm* — Edwards Angell Palmer & Dodge LLP; Kongsik Kim

(57) ABSTRACT

The present invention relates to a process for preparing a metal ion imprinted polymer which can selectively separate heavy metal ions, comprising: (a) reacting a metal salt and a monomer to make a monomer containing a metal ion group; (b) mixing the monomer containing the metal ion group, a cross-linker and an initiator in a solvent; (c) suspension polymerizing or emulsion polymerizing the obtained mixture to obtain a metal ion imprinted polymer containing a metal ion; and (d) removing the imprinted metal ion from said metal ion imprinted polymer.

10 Claims, 13 Drawing Sheets

Cu acrylate (a)

(b)

(c)

(d)

(e)

(a)

(b)

SELECTIVE SEPARATION OF HEAVY METAL ION USING METAL ION IMPRINTED POLYMER (MIIP)

CROSS-REFERENCE TO RELATED APPLICATION

The present application claims, under 35 U.S.C. §119(a), the benefit of Korean Patent Application No. 10-2006-0015107 filed on Feb. 16, 2006, the entire contents of which are hereby incorporated by reference.

BACKGROUND OF THE INVENTION

1. Field of the Invention

The present invention relates to a process of preparing a metal ion imprinted polymer that can separate heavy metal ions selectively.

2. Background Art

A molecularly imprinted polymer (MIP) or metal ion imprinted polymer (MIIP) as an eco-friendly and simplified separation tool has been developed. The term MIP or MIIP is referred to as the polymer which includes a space of the same form as a template. The space is formed by removing a template after a polymer is synthesized using as starting material a monomer bonded with the template.

Since only the template can be inserted into the space and a molecule whose stereo-structure is different from that of the template cannot be inserted, other molecules that are different from the template in structure can be separated using the polymer having the template space. This is the same theory as Fischer's Lock-and-Key Concept in which an antibody specifically interacts with a corresponding antigen, or Receptor Theory in which an enzyme has a specific activity with its counterpart substrate.

A process for preparing an MIP is disclosed in EP0190228. More specifically, to prepare an MIP or MIIP, a template is dissolved in a porogen and the template is mixed with a polymerizable monomer having a functional group that can react with a part of the template. Thereafter, polymerization is started by adding an excessive amount of a polymerization initiator and a cross-linker (i.e., an inert monomer) to maintain the array of functional monomers bonded with the template. In this procedure, the porogen dissolving the template plays an important role to determine the properties of the synthesized polymer. Particularly, since a polar porogen dissolves polar molecules, the bonds between the template and functional single molecules can be destroyed.

Actually, in connection with MIP techniques, numerous researches have been carried out to design and prepare molecules capable of recognizing specific molecules. Most of the researches have focused on separation of compounds difficult to be separated, for example, racemic mixtures, amino acids and so on.

The basic idea of the molecularly imprinted polymer technique to be applied to selective separation of heavy metal ions was suggested very recently. Researches have been performed in some developed countries such as the United States, Japan, Sweden and so on and the scope of the researches is becoming wider.

The Mosbach group of Lund University in Sweden tried selective separation of some kinds of similarly structured compounds by ion imprint [Mosbach, K. Trends biochem. 19, 9 (1994)]. Thereafter, the Murray group of Maryland University suggested the possibility of applying the selective separation property to metal ions like Pb(II), Cd(II), Li(I), Na(I), Mg(II), Ca(II), Cu(II), Zn(II), Hg(II) and so forth [Rrasado Rao, T., Sobhi Daniel, Mary Gladis, J., Trends in Analytical Chemistry, 23, 28 (2004), Yongwen Liu, Xijun Chang, Sui Wang, Yong Guo, Bingjun Din, Shuangming Meng, Analytica Chimica Acta, 519, 173 (2004)]. In addition, the Fish group of Lawrence Berkley Laboratory confirmed selective separation of Zn(II) ions using triazacyclononane ligand. Also, Japanese researchers including Kyushu University have made efforts to develop new separation tools using metal ion imprint with some significant results achieved.

When preparing the imprinted polymer using emulsion or suspension polymerization, however, attraction acting between the functional group of the monomer or template and water is required to be prevented. One suggested method is to use, in place of water, a dispersion solvent, which is not mixed with an organic monomer in emulsion polymerization and has no mutual attraction to the template. Since liquid perfluorocarbon is not mixed with most of the organic compounds, it can be used as a dispersion solvent in solution polymerization. In polymerization, liquid perfluorocarbon is expected to be able to emulsify the monomer, cross-linker, template, porogenic solvent and so on stably by interface activity of the fluoro series. Further, since there is no attraction acting on the functional group of the monomer and the solvent used in the polymerization, the number and the force of the conceiving (recognition) position are believed to be hardly affected [U.S. Pat. Nos. 5,872,198 and 5,959,050].

Nonetheless, liquid perfluorocarbon is expensive and the manufacturing costs for industrial application are high.

Accordingly, there is thus a need for a new process of preparing a metal ion imprinted polymer without using liquid perfluorocarbon.

BRIEF SUMMARY OF THE INVENTION

The object of the present invention is to provide a novel process for preparing a metal ion imprinted polymer, which does not require liquid perfluorocarbon and can resolve the problem associated with attraction between water and the functional group within monomers in a polymerization process using water.

Another object of the present invention is to provide a process for preparing a metal ion imprinted polymer, wherein heavy metal ions can be selectively separated.

To achieve the above-mentioned objects, in one aspect, the present invention provides a process for preparing a metal ion imprinted polymer which can selectively separate heavy metal ions, the process comprising: (a) reacting a metal salt molecule and a monomer to make a monomer containing a metal ion group; (b) mixing the monomer containing the metal ion group, a cross-linker and an initiator in a solvent; (c) suspension polymerizing or emulsion polymerizing the obtained mixture to obtain a metal ion imprinted polymer containing a metal ion; and (d) removing the imprinted molecule from said metal ion imprinted polymer.

In a preferred embodiment, the metal salt may be a salt selected from the group consisting of Cu, Pd, Li, Na, Mg, Ca, Zn, Hg and Fe. For example, a preferred metal salt may be $CuCO_3$.

Suitably, the monomer can be a carboxyl group containing acrylate monomer, styrene monomer or silane series monomer. For example, a preferred monomer can be acrylate, methacrylate, ethacrylate, vinyl benzoate, divinyl benzoate or ethylene glycol dimethacrylate.

A preferred solvent is a polar solvent. For example, preferably, the solvent can be selected from the group consisting of water, alcohol of $C_1$ to $C_6$ and hydrocarbon of $C_1$ to $C_6$.

In a preferred embodiment, mole ratio of cross-linker to monomer containing metal ion group may be from 2:1 to 14:1. Preferably, mole ratio of the total amount of cross-linker and monomer containing metal ion to the solvent can be from 2 to 20 wt/vol %.

Initiator for the present invention may preferably be selected from the group consisting of oxidation-reduction series initiator and hyperoxide series initiator. A preferred example of the initiator is azodiisobutyronitrile.

A suitable cross-linker may be an acrylate monomer, styrene monomer or silane series monomer. An example of the cross-linker is ethylene glycol dimethacrylate.

In another aspect, the present invention provides a process for preparing a metal ion imprinted polymer which selectively separates Cu, the process comprising: (a) reacting $CuCO_3$ and methacrylate to prepare Cu methacrylate monomer; (b) mixing the Cu methacrylate monomer, ethylene glycol dimethacrylate monomer and azodiisobutyronitrile in a solvent; (c) suspension polymerizing or emulsion polymerizing the obtained mixture to obtain a metal ion imprinted polymer containing a Cu ion; and (d) agitating said metal ion imprinted polymer in nitric acid to remove the Cu ion.

BRIEF DESCRIPTION OF THE DRAWINGS

These, and other features and advantages of the invention, will become clear to those skilled in the art from the following detailed description of the preferred embodiments of the invention rendered in conjunction with the appended drawings.

FIG. 3(a) to 3(d) are respectively the EDX analytic diagrams of Cu(II)-MIIP in which the mole ratio (R) of cross-linker to monomer is 2 (the mole ratio (R) of cross-linker to monomer is 2:1), 6, 10 and 14 and FIG. 3(e) is the EDX analytic diagram of MIIP in which R is 10.

DETAILED DESCRIPTION

As discussed above, in one aspect, the present invention provides a process for preparing a metal ion imprinted polymer which can selectively separate heavy metal ions, the process comprising: (a) reacting a metal salt molecule and a monomer to make a monomer containing a metal ion group; (b) mixing the monomer containing the metal ion group, a cross-linker and an initiator in a solvent; (c) suspension polymerizing or emulsion polymerizing the obtained mixture to obtain a metal ion imprinted polymer containing a metal ion; and (d) removing the imprinted molecule from said metal ion imprinted polymer.

In step (a), a monomer containing a metal ion group in a chemical structure is prepared. A metal salt is used as the salt containing a metal ion as a template. More particularly, the salt containing a metal ion can be selected from the group consisting of Cu, Pd, Li, Na, Mg, Ca, Zn, Hg and Fe. For example, metal salt includes $CuCO_3$. The salt in the present invention is intended to be such that said metal well known to the skilled person in the art is combined with a negative ion generally combined with a metal.

Said monomer includes monomers which can form monomers containing a metal ion when combined with a metal ion and thereafter can be polymerized by a cross-linker. The monomer which can be used in the present invention includes a carboxyl group containing acrylate monomer, styrene monomer or silane series monomer and can be variously used depending on said metal ion group. Preferably, the monomer includes acrylate, methacrylate, ethacrylate, vinyl benzoate, divinyl benzoate and ethylene glycol dimethacrylate.

Figure 1:
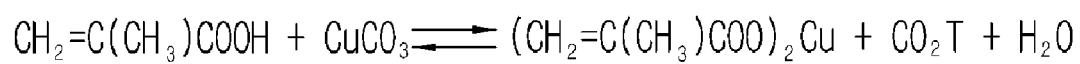
FIG. 1 is the scheme of the imprinted polymer monomer synthesis of the present invention.
Figure 1:
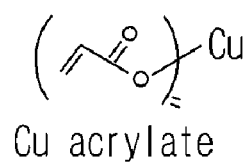

Metal salt and monomer are mixed stoichiometrically in a proper solvent to react, and thereafter the solvent is removed to obtain a monomer containing a metal ion. At this time, the reaction time and the solvent can be adequately controlled depending on the metal salt and the monomer. For example, in case of Cu, as shown in FIG. 1, $CuCO_3$ and methacrylate are mixed stoichiometrically in dichloro methane and are reacted at room temperature for more than 2 days and thereafter the solvent is evaporated to obtain solid Cu methacrylate monomer.

In step (b), the monomer containing the metal ion group obtained in the solvent, a cross-linker and an initiator are mixed.

The solvent is characterized in that a polar solvent can be used. It is why attraction between the functional group within the monomer and the solvent in the polymerization process using a polar solvent can be excluded if a monomer containing a metal ion group is used in the metal ion imprinted polymer preparation. The preferable solvent comprises not only water but one selected from the group consisting of alcohol of $C_1$ to $C_6$ and a hydrocarbon of $C_1$ to $C_6$.

Figure 5:
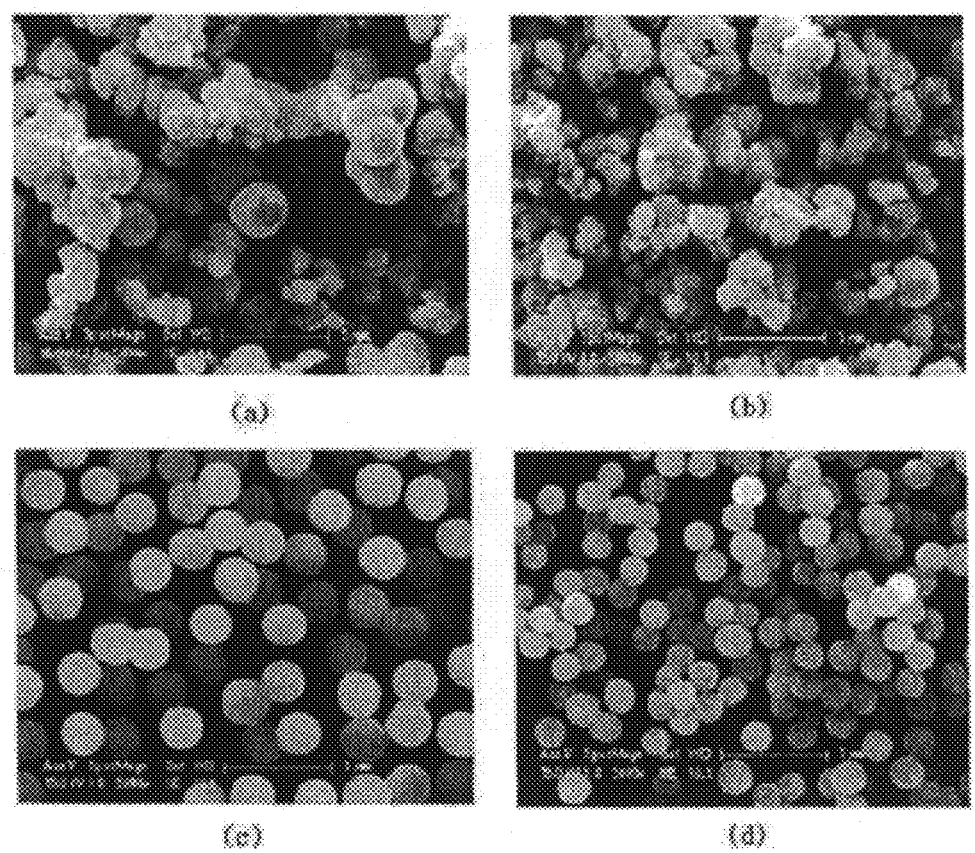
FIG. 5 is the scanning electron microscopic photo of the particle produced according to the cross-linker concentration ((a) R=2, (b) R=6, (c) R=10 and (d) R=14, R is the mole ratio of cross-linker to monomer).

A cross-linker is a material, which can react with a monomer containing a metal ion group to polymerize it, and general cross-linkers used in the art can be variously selected for use. For example, the cross-linker could be ethylene glycol dimethacrylate. The concentration of the cross-linker is important for determining the size and uniformity of the final metal ion imprinted polymer particles. Accordingly, in the present invention the mole ratio of cross-linker to monomer containing a metal ion group in the mixture can be controlled depending on the desired polymer particle size and it is preferable that the mole ratio is limited to from 2:1 to 14:1. As shown in FIG. 5, as the mole ratio increases, the final metal ion imprinted polymer particle size becomes smaller and uniformity increases.

Figure 7:
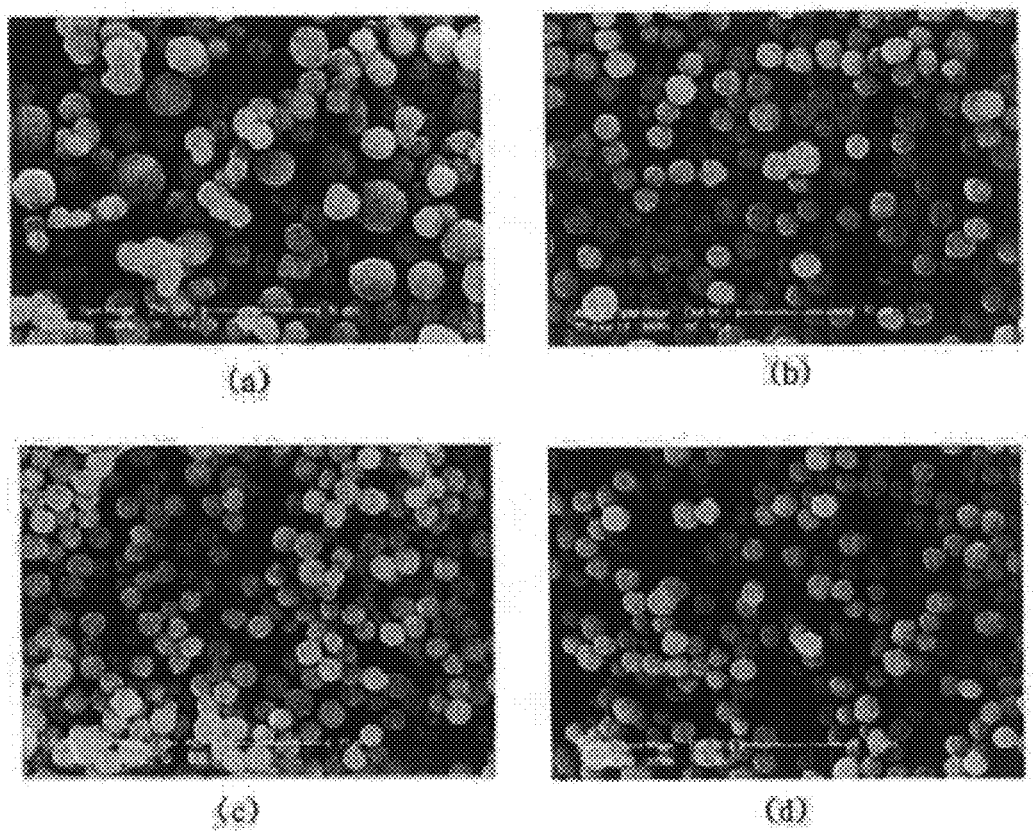
FIG. 7 is the scanning electron microscopic photo of the particle produced according to the initiator concentration (the initiator concentration is (a) 1, (b) 2.5, (c) 4 and (d) 7 wt %).

An initiator is a material initiating polymerization and can be variously selected from general initiators used in the art. Preferably, it could be an oxidation-reduction series initiator or a hyperoxide series initiator, and for example it could be azodiisobutyronitrile. The amount of initiator can be controlled depending on the particle size of the desired polymer and is preferably 1 to 7 wt % based on the total amount of monomer. As shown in FIG. 7, as the amount of initiator increases the particle size decreases and that is why an increase of initiator concentration increases the number of free radicals produced in the polymerization process.

In addition, the mole ratio of the total weight of the monomer (the amount of cross-linker and monomer containing a metal ion) to solvent can be properly controlled depending on the desired particle size and is preferably limited to from 2 to 20 wt/vol %. Then, as the total amount of monomer to solvent increases, the particle size becomes larger.

In step (c), the obtained mixture is suspension polymerized or emulsion polymerized to obtain a metal ion imprinted polymer containing a metal ion. Suspension polymerization or emulsion polymerization are processes well known to the skilled person in the art.

In step (d), the imprinted molecule is removed from the metal ion imprinted polymer containing the obtained metal ion to obtain the metal ion imprinted polymer, which can selectively separate heavy metal ions. The imprinted polymer can be removed by washing the obtained polymer with a specific liquid material. For the metal ion imprinted polymer containing Cu metal ion, it is agitated and filtered in nitric acid to remove the Cu ion from the imprinted polymer, and this procedure can be repeated several times for complete removal.

The metal ion imprinted polymer prepared in the present invention can consist of spherical particles of from 1 to 99 μml diameter, and can remember the template in the tetrahedron-structural hole of the polymer surface, which is a property of heavy metal ions due to the template effect to separate heavy metal ions selectively. The superiority of such selectivity can be demonstrated through the following Examples. In addition, the metal ion imprinted polymer of the present invention has a greater ability for separation of heavy metal ions with smaller particle size, which is due to the increased surface area of the polymer particle.

Such metal ion imprinted polymer can be used in HPLC fillers, artificial enzymes, antibodies, sensors and so on, which require separation of heavy metal ions.

Reference will now be made in detail to the preferred embodiment of the present invention, examples of which are illustrated in the drawings attached hereinafter. The embodiments are described below so as to explain the present invention by referring to the figures.

EXAMPLE 1

Preparation of a Metal Ion Imprinted Polymer which can Selectively Separate Cu Ions Step (a): Preparation of Cu Methacrylate Monomer As shown in FIG. 1, $CuCO_3$ was added to methacrylate (MAA) stoichiometrically, and then dichloromethane was used as a solvent. After adding, it stood at room temperature for more than 2 days. The reaction mixture was filtered to remove undissolved impurities and dichloromethane solvent was evaporated to obtain solid Cu methacrylate monomer.

Steps (b) and (c): Preparation of a Metal Ion Imprinted Polymer Containing a Cu Ion A metal ion imprinted polymer was prepared by precipitation polymerization to obtain a Cu ion imprinted microsphere.

More particularly, $Cu(MAA)_2$, ethylene glycol dimethacrylate (EGDMA) comonomer mixture and azodiisobutyronitrile (AIBN) were mixed. Then, the mole ratio of EGDMA:$Cu(MAA)_2$ (R) in the monomer mixture was changed to from 2:1 to 14:1 and the mole ratio of the total amount of monomer($Cu(MAA)_2$ and EGDMA) to medium was changed to from 2 to 20 wt % based on the intermediate. In addition, the amount of AIBN to the total amount of monomers was changed from 1 to 7 wt %. After 30 ml of isopropanol containing reaction mixture was added to the chemical reactor (50 ml) it was ultrasonically pulverized for 5 minutes and purged with nitrogen for 15 minutes. The chemical reactor was taken to a rotary evaporator and was rotated at the center of a declined axis at a speed of 70 rpm. The temperature of the double boiler was heated from room temperature to 70° C. for more than 2 hours and then was held to at 70° C. in $N_2$ atmosphere for 24 hours. After completion of the polymerization reaction, the obtained particle was washed with methanol several times and was dried in a vacuum at 50° C. Reproducibility of the result was demonstrated through experiments repeated several times.

Step (d): Removal of the Cu Ion from the Metal Ion Imprinted Polymer

The metal ion imprinted polymer prepared in the above-described manner was filtered in 0.4M $HNO_3$ for 40 minutes with agitating. For complete removal of the Cu ion, said procedure was repeated 5 times and it was proved as AAS. After extraction, the polymer particle was washed and dried in a vacuum.

Figure 2A:
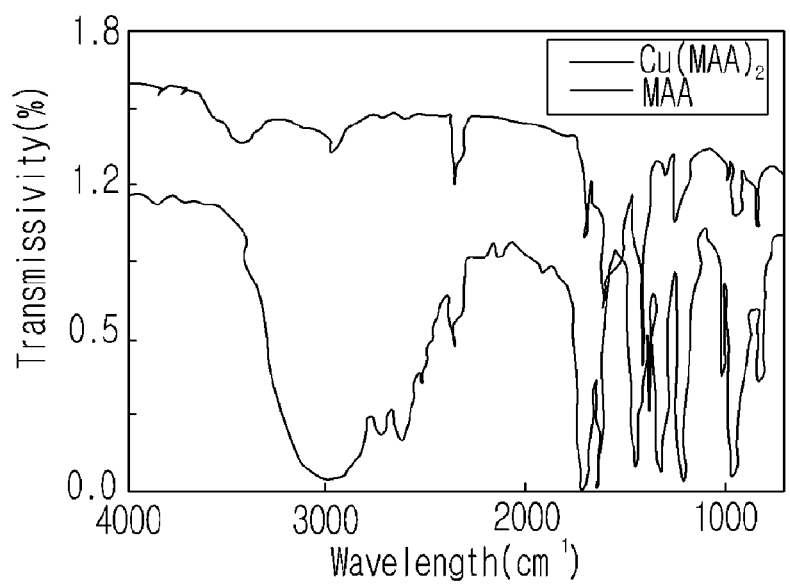
FIGS. 2a and 2b are respectively the IR analytic diagrams of Cu(II)-MIIP, MIIP and non-MIIP.

FIG. 2 represents the infrared spectrum of MAA, $Cu(MMA)_2$, MIIP (each polymer before and after removal of the Cu ion) and non-MIIP. As shown in FIG. 2(a), bonding between the COO— group in MAA and the metal resulted in shifting C=O(1693.4 $cm^{-1}$), C=C(1639.4 $cm^{-1}$) and C—O (1203.5 $cm^{-1}$) to C=O(1683.8 $cm^{-1}$), C=C(1595.1 $cm^{-1}$) and C—O(1242.1 $cm^{-1}$) in $Cu(MMA)_2$. In addition, though stretching vibration of —OH in MAA showed a very strong peak in the spectrum, it disappeared in $Cu(MMA)_2$.

Figure 2B:
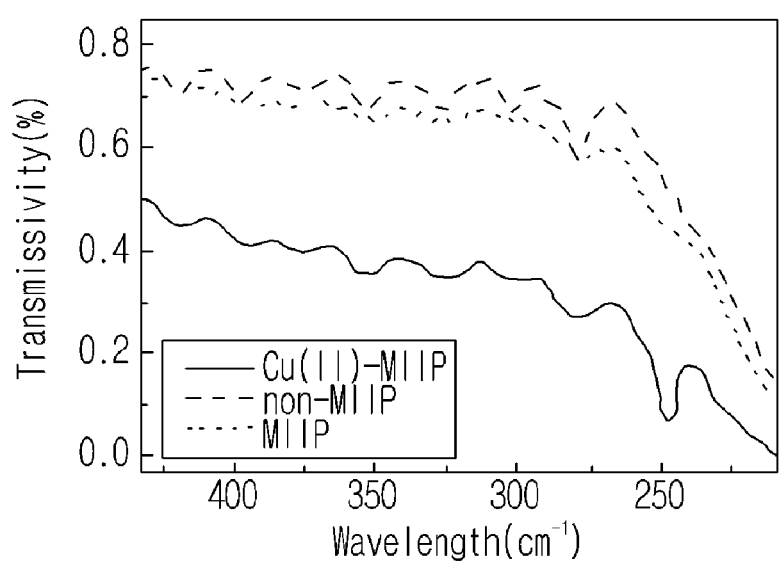

As shown in FIG. 2(b), as for peak of the (O—Cu) group, it appeared as 245 $cm^{-1}$ in Cu(II)-MIIP but did not appear in non-MIIP and MIIP. From said results, it can be known that synthesis of Cu methacrylate and removal of the Cu ion from Cu(II)-MIIP were accomplished.

Figure 3:
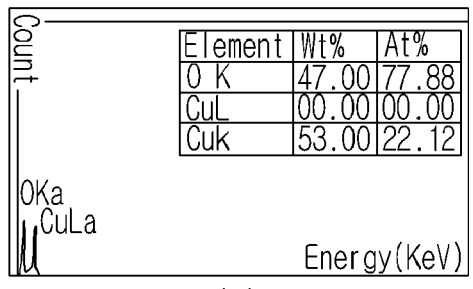
FIG. 3 is the EDX analytic diagram of Cu(II)-MIIP and MIIP.
Figure 3:
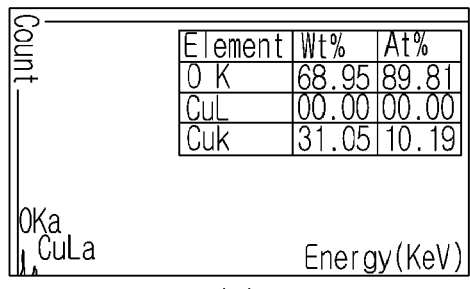
Figure 3:
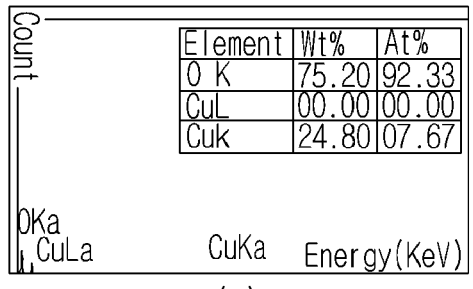
Figure 3:
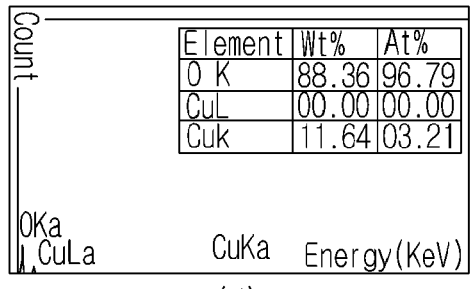
Figure 3:
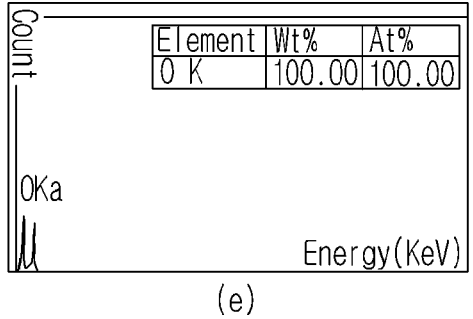

In addition, the presence and complete removal of $Cu^{2+}$ in Cu(II)-MIIP and MIIP was demonstrated by EDX. As shown in FIG. 3, the signal corresponding to $Cu^{2+}$ obviously appeared in Cu(II)-MIIP and did not appear in MIIP. Also, the greater the concentration of $Cu(MMA)_2$ in the polymer mixture became the stronger the signal became.

Figure 4:
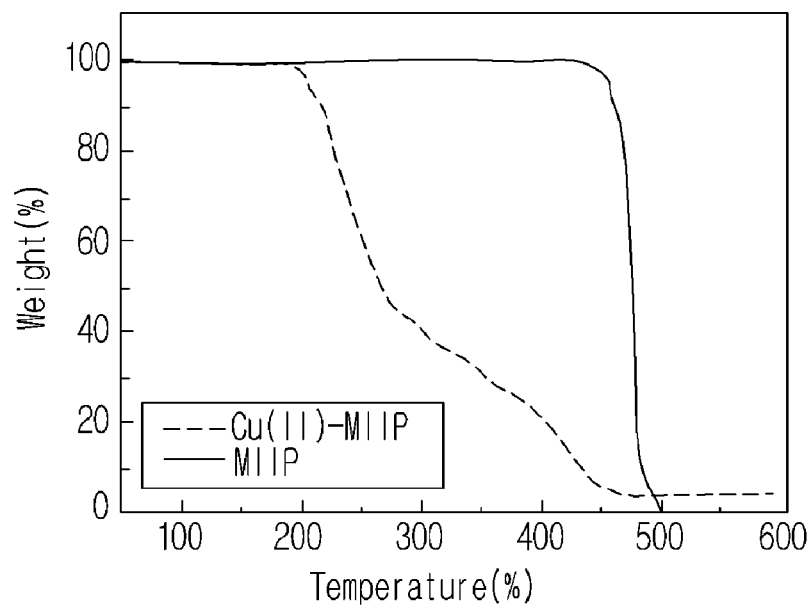
FIG. 4 is the TGA analytic diagram of Cu(II)-MIIP and MIIP.

Also, FIG. 4 represents the TGA results of Cu(II)-MIIP and MIIP. In Cu(II)-MIIP, it was stable to 210° C. but decreased suddenly at more than 210° C., which is thought to be why oxidation of a polymer containing metal by oxygen and decomposition of COOCu occurred. It is also a reason why evaporation of isopropanol present within the polymer occurred.

EXAMPLE 2

Analysis of the Metal Ion Imprinted Polymer Prepared According to a Preferred Embodiment of the Present Invention FIG. 5 represents the particle of the metal ion imprinted polymer produced by various changes of the ratio of Cu(MAA)$_2$ to EGDMA in mixing 4 wt % AIBN and monomer (14 wt/vol % based on the whole monomer in isopropanol). Slightly solidified particles were observed mole ratios less than 10 of EGDMA:Cu(MAA)$_2$ (R).

As the ratio of Cu(MAA)$_2$ increased, the particle diameter decreased and uniformity increased. As EGDMA concentration increased in the monomer composition, the solubility of the nucleus in isopropanol fell down. The final particle size became smaller due to a number of nucleuses formed in the early step. In addition, a higher concentration of cross-linker reduced expansion and coagulation in the middle procedure, resulting in making smaller and more narrowly dispersed microspheres.

Consequently, it can be understood that the concentration of cross-linker plays an important role in determining the final particle size and uniformity.

Figure 6:
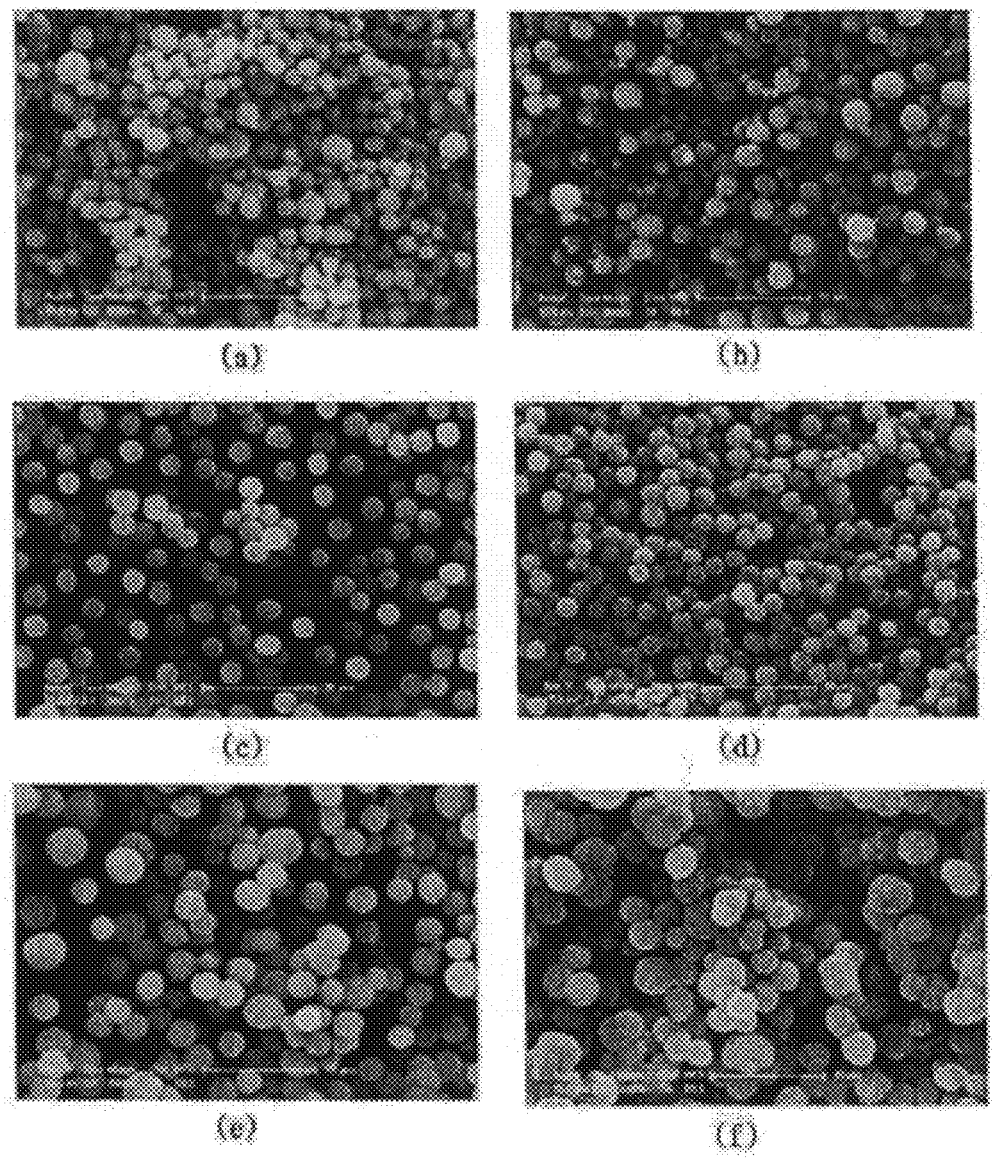
FIG. 6 is the scanning electron microscopic photo of the particle produced according to the monomer concentration (the monomer concentration is (a) 2, (b) 5, (c) 8, (d) 14, (e) 17 and (f) 20 wt %).

FIG. 6 represents microphotographs of the produced microspheres. Total monomer concentration was changed from 2 to 20 wt/vol % based on 4 wt % AIBN and R=10. The diameter of the microsphere increased gradually from 1.7 to 3.4 in proportion to the monomer concentration. Also, though solidified small particles were obtained in high concentration of more than 20 wt/vol %, the microspheres were stable without serious solidification. Nucleuses formed in the early state in the low concentration of monomer (2 wt/vol %) had a tendency to absorb monomers or low polymer groups to grow rather than to be coagulated. Therefore, wider particle distribution can be obtained.

Consequently, it can be understood that the size and structure of microsphere depends on the first monomer concentration and the properties of the solvent.

FIG. 7 represents an SEM image of MIIP produced depending on the concentration of the initiator (AIBN). As AIBN concentration increased from 1 to 7 wt % (Cu(MAA)$_2$ and EGDMA monomer) the particle size decreased from 4 μm to 2.3 μm. Increasing the concentration of initiator increases the number of free radicals produced in the polymerization process.

Figure 8:
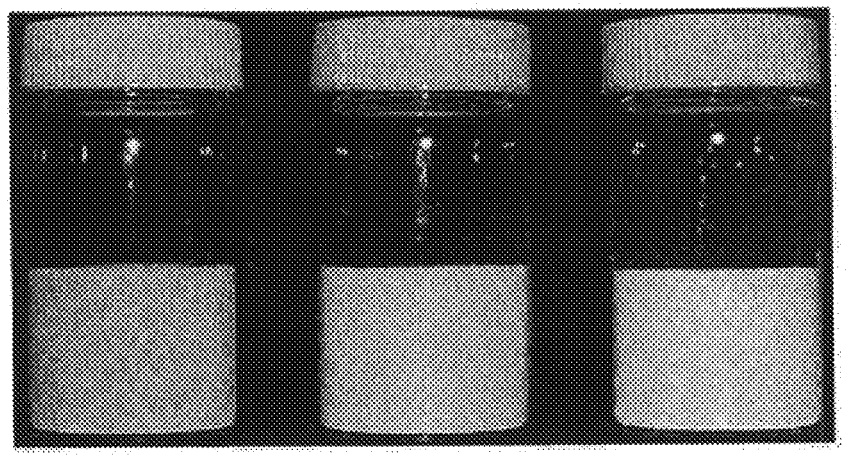
FIG. 8 is the color digital photo indicating the color tone of Cu(II)-MIIP, MIIP and non-MIIP.

As shown in FIG. 8, the Cu(II)-MIIP color of microparticles before/after Cu$^{2+}$ removal turned from blue to white.

Figure 9:
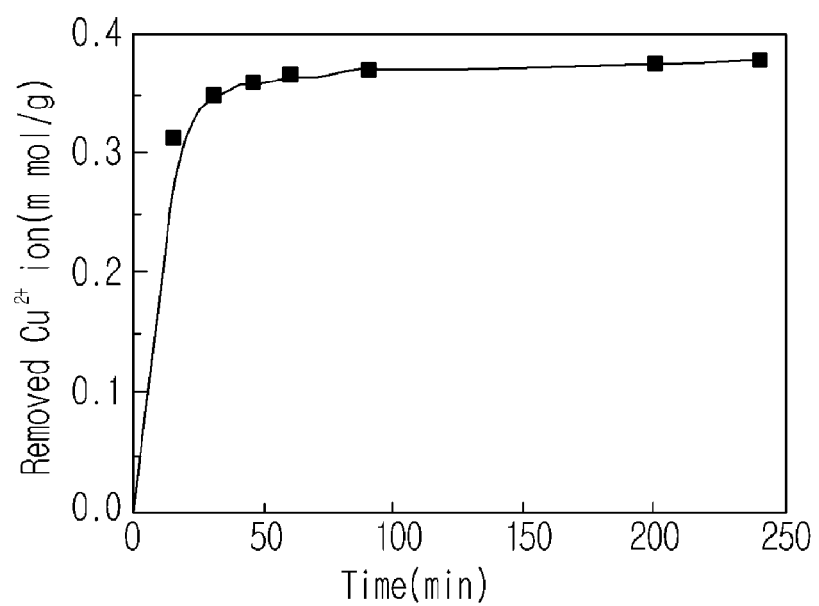
FIG. 9 is the AAS analytic diagram indicating the removal of Cu(II) from Cu(II)-MIIP particle.

FIG. 9 is an ASS analytic diagram representing the removal behavior of Cu(II) from a Cu(II)-MIIP particle. Table 1 represents theoretical and experimental values of the amount removed in the removal process of Cu$^{2+}$ from Cu(II)-MIIP and it can be understood that the theoretical values and the experimental results are similar.

TABLE 1

| | (Cu(MAA)$_2$:EGDMA(mol:mol) | | | |
|---|---|---|---|---|
| | 1:2 | 1:6 | 1:10 | 1:14 |
| amount of removed Cu(II) (g/1 g particle) | 0.095 | 0.040 | 0.027 | 0.020 |
| amount of removed Cu(II) (theoretical value)(g/1 g particle) | 0.102 | 0.045 | 0.029 | 0.021 |

EXAMPLE 3

Influence of the Early Metal Ion Concentration

To investigate the influence of the imprint technique, an experiment on the adsorption of Cu$^{2+}$, Ni$^{2+}$ and Cd$^{2+}$ ions in aqueous solution using metal ion imprinted polymer particles was performed at pH 5.6.

Figure 10:
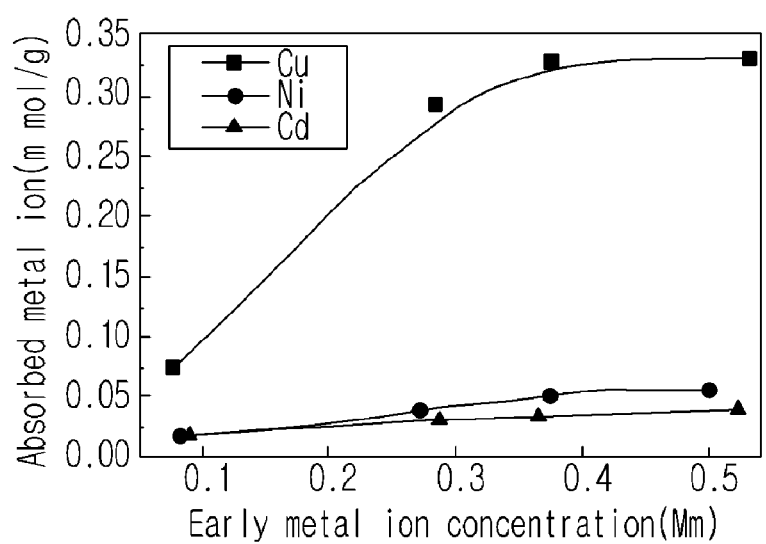
FIG. 10 is the AAS analytic diagram indicating the influence on adsorption power of MIIP depending on the concentration of metal ions.

As shown in FIG. 10, the amount of metal ions adsorbed per unit weight of MIIP increased as the concentration of metal ions increased. Adsorption was finished in the metal ion concentration of about 0.35 m mol. Adsorption of Cu$^{2+}$ ions showed a much higher result than other metal ions and the maximum adsorption amount was 0.331 mmol/g.

EXAMPLE 4

Figure 11:
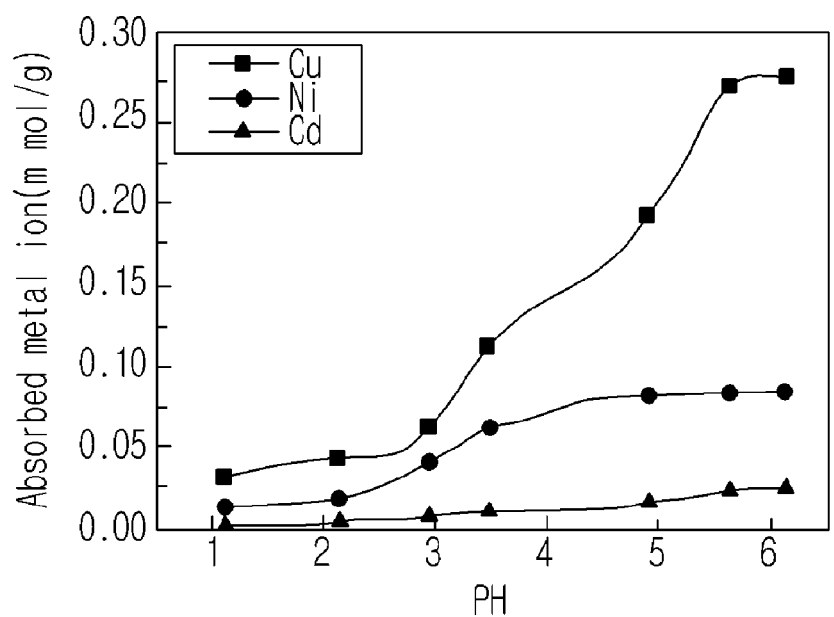
FIG. 11 is the AAS analytic diagram indicating the influence on adsorption power of MIIP depending on pH.

Influence of pH pH of aqueous solution will increase as the hydrogen ion of the carboxyl group of the polymer chain departs, and accordingly the possibility to form a carboxyl group containing a Cu ion increases. Concentrations of pH 1 to 6 were used to determine the optimum pH concentration. The result illustrated the influence of pH in detail. As shown in FIG. 11, adsorption amount of metal ions increased as the pH value increased (increase of hydrogen isolation from the carboxyl group, which play the role of adsorbing the metal ion). At a pH of less than 3.0, the adsorption amount is very low due to MIIP protonization. Imprinted microspheres show higher Cu(II) ion adsorption than other metal ions in the entire range of pH including pH 6.

EXAMPLE 5

Adsorption Rate

Figure 12:
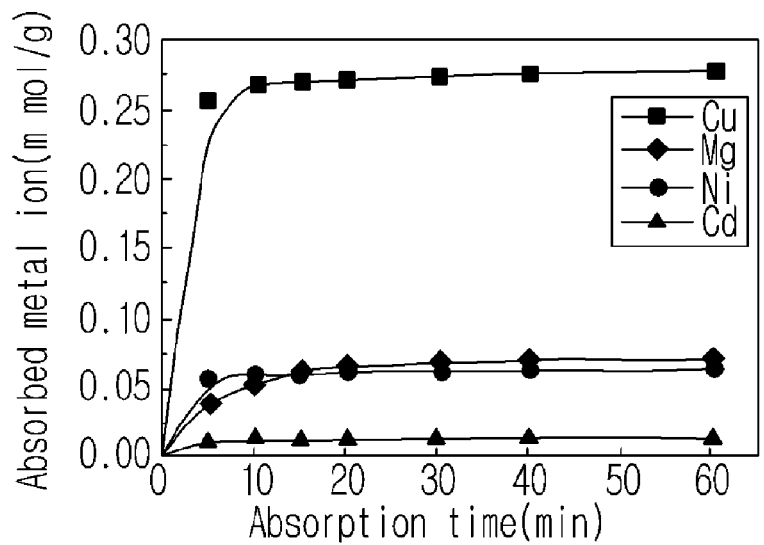
FIG. 12 is the AAS analytic diagram indicating the adsorption rate of MIIP (a) and non-MIIP (b) depending on the concentration of metal ions.
Figure 12:
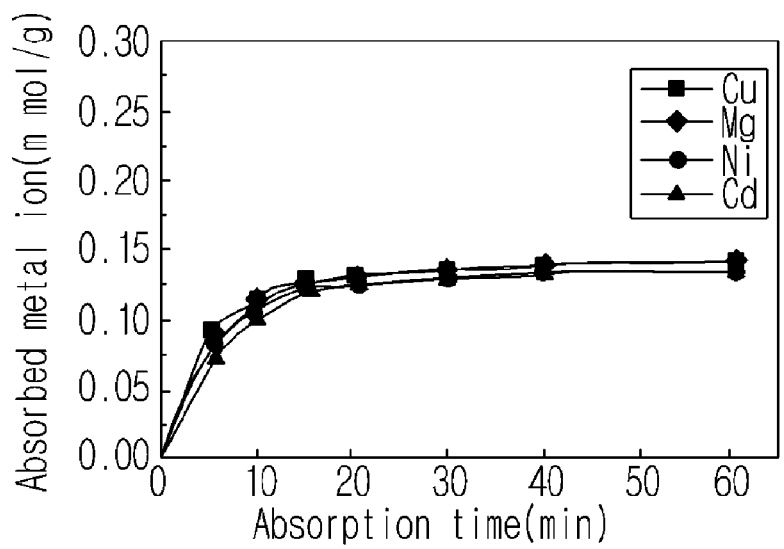

FIG. 12 represents the adsorption amount of metal ions in MIIP and non-MIIP depending on time. High adsorption rate was shown in the early adsorption process and adsorption equilibrium was reached rapidly in less than 10 minutes. The maximum adsorption amount of Cu$^{2+}$ ion was 0.279 m mol per 1 g of dried imprinted particles. Such rapid reaching of the adsorption equilibrium is probably due to the high synthesis rate and geometrical affinity of Cu$^{2+}$ and the imprinted position in the microstructure. It is well known that removal of the template from the polymer provides the template with complementary size and form and chemical functionality. Such template effect is to make the hole of the tetrahedral structure of the polymer surface remember the property of the Cu ion. Such hole of tetrahedral structure can be formed on the surface to accelerate interaction with the imprinted Cu ion.

EXAMPLE 6

Influence of Particle Size

Figure 13:
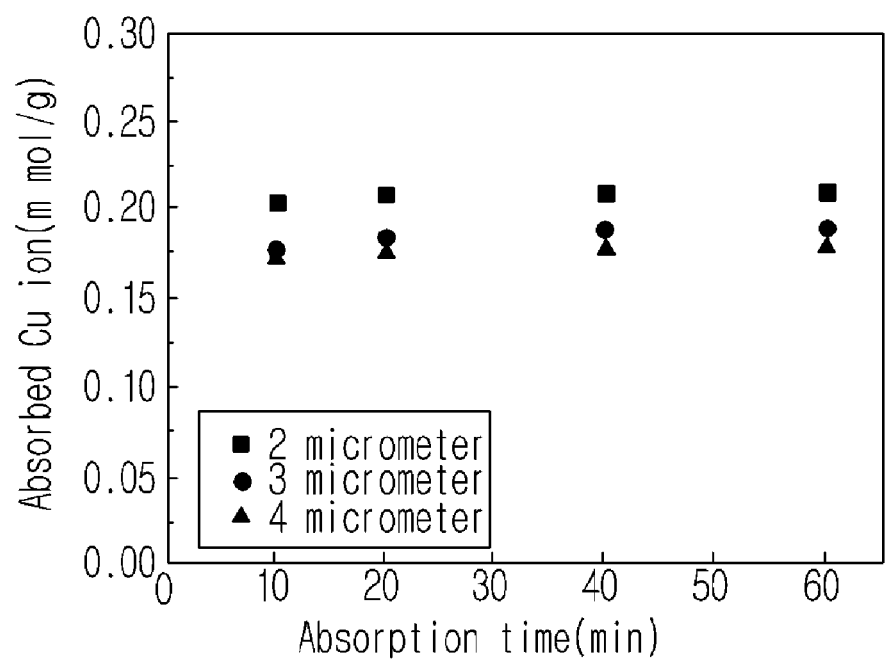
FIG. 13 is the AAS analytic diagram indicating the relationship between the adsorption power of MIIP and the particle size.

The influence of particle size can be shown in FIG. 13. Consequently, the amount of Cu adsorbed in the equilibrium state increased as the particle size decreased due to the increased surface of MIIP particles.

EXAMPLE 7

Selectivity Diagram

The experiment was performed that selectivity of the imprinted polymer for Cu ions is to recollect Cu ions in various competitive metal ions. Distribution ratio, selective coefficient and relative selective coefficient are used in this equation. Distribution ratio (D) is given in following Equation 1.

$$D = \frac{C_A - C_B}{C_A} \times \frac{v}{m} \qquad \text{[Equation 1]}$$

wherein v is the volume of solution (ml);

m is the mass of the metal ion imprinted polymer particle (g); and $C_A$ and $C_B$ are respectively the first concentration and the final concentration of metal ions (m mol/l).

The selective coefficient for binding Cu ions to other kinds of ions can be obtained through the data of the equilibrium state according to following Equation 2.

$$\alpha = \frac{D_{Cu}}{D_M} \quad \text{[Equation 2]}$$

wherein, $D_{Cu}$ and $D_M$ respectively represent the distribution ratio of $Cu^{2+}$ and other metal ions.

Comparison of the selective coefficient of metal ion imprinted particles and non-imprinted particles is determined by the result of the selective imprint. The relative selective coefficient $\alpha_r$ can be defined by following Equation 3:

$$\alpha_r = \frac{\alpha_i}{\alpha_n} \quad \text{[Equation 3]}$$

wherein, $\alpha_i$ and $\alpha_n$ are respectively the selective coefficients of MIIP and non-MIIP and as shown in following Table 2, the D value of MIIP represents an increased value of Cu(II) and other ions are shown to be decreased, definitely.

Ni(II) can enter the imprinted position more easily than Zn(II) (74 pm) and Cd (92 pm) with smaller ion radius (69 pm) than Cu(II) (71 pm), which shows larger Di than Zn(II) and Cd(II) like this. Though it had an ion electric charge and ion radius similar to Mg(II) its arrangement in coordinate geometric structure probably resulted from smaller Di than Cu(II). Na(I) showed higher Di and Dn than Ni(II), Mg(II), Zn(II), Cd(II) and Fe(III). Na(I) is not adequate for imprinted positions and will be related to rather many functional positions. Since Fe(III) enters an easier position than Cd(II) and has an implication to catch quite large particles with two imprinted spaces or to have a binding power in other ways, Fe(III) has a higher Di than Cd(II). It can be explained by comparing the Dn values of non-MIIP having irregular functional part with the Di values of MIIP.

The relative selective coefficient is the sign similarly indicating the adsorption recognition part to the imprinted Cu ion. As experiment results, relative selective coefficients (Cu(II)/Mg(II), Cu(II)/Ni(II), Cu(II)/Zn(II), Cu(II)/Cd(II), Cu(II)/Na(I) and Cu(II)/Fe(III)) of Cu imprinted particle were respectively 32.8, 38.2, 49, 184.2, 32.5 and 42.9 times and it gave better results than the respective non-imprinted base. This result represents that functional mother molecules (remembered hole) in the MIIP particle surface is set in the extremely precisely inclined shape for Cu ions for the sign of ion to influence the properties of the metal ion and it depends on ion radius and electric charge.

TABLE 2

Alternative diagram of MIIP and non-MIIP to several metal ions

| metal ion | ion electric charge | ion radius (pm) | Di | Dn | $\alpha_i$ | $\alpha_n$ | $\alpha_r$ |
|---|---|---|---|---|---|---|---|
| Cu | 2 | 71 | 450 | 42.3 | — | — | — |
| Ni | 2 | 69 | 10.9 | 39.1 | 41.3 | 1.08 | 38.2 |
| Mg | 2 | 71 | 14.3 | 43.9 | 31.5 | 0.96 | 32.8 |
| Zn | 2 | 74 | 10.1 | 46.3 | 44.6 | 0.91 | 49 |
| Cd | 2 | 92 | 2.2 | 38.1 | 204.5 | 1.11 | 184.2 |
| Na | 1 | 113 | 17.3 | 53 | 26.0 | 0.8 | 32.5 |
| Fe | 3 | 63 | 8.6 | 34.6 | 52.3 | 1.22 | 42.9 |

As described in the above, according to the preferred embodiments of the present invention, a monomer containing a metal ion in its chemical structure can be used to perform suspension polymerization or emulsion polymerization and a metal ion imprinted polymer can be prepared without using an expensive solvent such as the existing liquid per fluorocarbon. Thus prepared metal ion imprinted polymers can be used to selectively separate heavy metal ions. They can be applied, for example, in HPLC fillers, artificial enzymes, antibodies, sensors and so on, which require separation of heavy metal ions.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A process for preparing a metal ion imprinted polymer which can selectively separate heavy metal ions, the process comprising:

reacting a metal salt selected from the group consisting of Cu, Pd, Li, Na, Mg, Ca, Zn, Hg and Fe and a monomer selected from the group consisting of acrylate, methacrylate, ethacrylate and ethylene glycol dimethacrylate to make a monomer containing a metal ion group;

mixing the monomer containing the metal ion group, a cross-linker and an initiator in a solvent;

suspension polymerizing or emulsion polymerizing the obtained mixture to obtain a metal ion imprinted polymer containing a metal ion; and removing the metal ion from said metal ion imprinted polymer.

2. The process of claim 1, wherein the metal salt is $CuCO_3$.

3. The process of claim 1, wherein the solvent is a polar solvent.

4. The process of claim 1, wherein the solvent is selected from the group consisting of water, alcohol of $C_1$ to $C_6$ and hydrocarbon of $C_1$ to $C_6$.

5. The process of claim 1, wherein the mole ratio of the cross-linker to the monomer containing metal ion group is from 2:1 to 14:1 and the mole ratio of the total amount of cross-linker and monomer containing metal ion to the solvent is from 2 to 20 wt/vol %.

6. The process of claim 1, wherein the initiator is selected from the group consisting of oxidation-reduction series initiator and hyperoxide series initiator.

7. The process of claim 5, wherein the initiator is azodiisobutyronitrile.

8. The process of claim 1, wherein the cross-linker is an acrylate monomer, styrene monomer or silane series monomer.

9. The process of claim 7, wherein the cross-linker is ethylene glycol dimethacrylate.

10. A process for preparing a metal ion imprinted polymer which selectively separates Cu, the process comprising:
reacting $CuCO_3$ and methacrylate to prepare Cu methacrylate monomer;
mixing the Cu methacrylate monomer, ethylene glycol dimethacrylate monomer and azodiisobutyronitrile in a solvent;
suspension polymerizing or emulsion polymerizing the obtained mixture to obtain a metal ion imprinted polymer containing a Cu ion; and
agitating said metal ion imprinted polymer in nitric acid to remove the Cu ion.

* * * * *